(12) United States Patent  
Banerjee et al.

(10) Patent No.: US 9,332,454 B2  
(45) Date of Patent: May 3, 2016

(54) METHOD, SYSTEM AND PROGRAM PRODUCT FOR DETECTING, QUANTIFYING AND LOCALIZING OF WIRELESS INTERFERERS

(71) Applicants: Suman Banerjee, Madison, WI (US); Shravan Rayanchu, Sunnyvale, CA (US); Ashish Patro, Madison, WI (US)

(72) Inventors: Suman Banerjee, Madison, WI (US); Shravan Rayanchu, Sunnyvale, CA (US); Ashish Patro, Madison, WI (US)

(*) Notice: Subject to any disclaimer, the term of this patent is extended or adjusted under 35 U.S.C. 154(b) by 311 days.

(21) Appl. No.: 14/019,507

(22) Filed: Sep. 5, 2013

(65) Prior Publication Data

US 2014/0071845 A1 Mar. 13, 2014

Related U.S. Application Data

(60) Provisional application No. 61/698,127, filed on Sep. 7, 2012.

(51) Int. Cl.
*H04L 1/00* (2006.01)
*H04L 12/26* (2006.01)
*H04W 24/10* (2009.01)

(52) U.S. Cl.
CPC .................................... *H04W 24/10* (2013.01)

(58) Field of Classification Search
None
See application file for complete search history.

(56) References Cited

U.S. PATENT DOCUMENTS

| 7,907,579 | B2 | 3/2011 | Fitzgerald | |
|---|---|---|---|---|
| 8,340,580 | B1 | 12/2012 | Epstein | |
| 9,107,172 | B1* | 8/2015 | Epstein | H04B 1/1027 |
| 2004/0028003 | A1* | 2/2004 | Diener | H04L 1/0001 370/319 |
| 2006/0171326 | A1* | 8/2006 | Durand | H04L 1/0001 370/252 |
| 2010/0194985 | A1* | 8/2010 | Unger | H04N 5/50 348/570 |
| 2010/0254267 | A1 | 10/2010 | Blackwell | |
| 2010/0296401 | A1* | 11/2010 | Karaoguz | H04L 41/0806 370/252 |

\* cited by examiner

*Primary Examiner* — Kenny Lin (57) ABSTRACT

A method, system and program product comprise receiving spectrum data from one or more WiFi communication devices being configured to be operable as observers of transmissions within a frequency band associated with a WiFi communication system. The spectrum data at least comprises signal levels and timing information for WiFi communication signals and non-WiFi signals observed within the frequency band. WiFi interferers are distinguished using at least the signal levels and timing information for the non-WiFi signals. A real-time interference impact on the observed WiFi communication signals for each of the distinguished WIFi interferers is determined.

20 Claims, 7 Drawing Sheets

METHOD, SYSTEM AND PROGRAM PRODUCT FOR DETECTING, QUANTIFYING AND LOCALIZING OF WIRELESS INTERFERERS

CROSS-REFERENCE TO RELATED APPLICATIONS

The present Utility patent application claims priority benefit of the U.S. provisional application for patent Ser. No. 61/698,127 entitled "Detecting Wireless Interferers and Quantifying the Impact and Location of Wireless Interferers With Applications in WiFi and Other WiFi-Like Environments" filed on Sep. 7, 2012 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

The following related U.S. patent application(s), submitted by at least one of the present Applicant(s)/Inventor(s) is/(are) recently co-pending:
U.S. utility patent application Ser. No. 14/020,838, entitled "A Method, System and Program Product for Detecting Wireless Interferers", submitted to the United States Patent and Trademark Office (USPTO) on Sep. 7, 2013.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to observation of wireless interference. More particularly, the invention relates to observation of wireless interference between devices incorporating different technological systems.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The problem of attributing causes of interference may be fundamental to wireless environments. In particular, WiFi systems may not have any effective way of determining which specific other devices may be causing interference.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. One such aspect of the prior art shows a carrier-managed system such as a cellular network or a GPS which may be leveraged to directly determine or triangulate geographic locations of a dual mode device and then an access point. By way of educational background, another aspect of the prior art generally useful to be aware of teaches of a wireless device that may include a transceiver which may communicate with a network through an access point using a radio frequency signal on a channel. Yet another aspect of the prior art discloses of methods and apparatuses to analyze radio frequency signals in order to detect and classify radio frequency devices in wireless networks. However, these solutions may be incapable of providing needed information about interferers. A solution which allowed for using WiFi devices as observers to determine a location of a non-WiFi device in space would be desirable.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a microcomputer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

In many embodiments of the present invention, an interferer may be any transmitting device which may or may not be part of a specific wireless communication system. In a non-limiting example, potential interferers may include, without limitation, WiFi transmitters, Bluetooth devices, ZigBee devices, microwave ovens, etc.

Some embodiments of the present invention may provide means and/or methods for detecting, localizing, and/or quantifying interference impact of various interference sources on wireless traffic.

Figure 1:
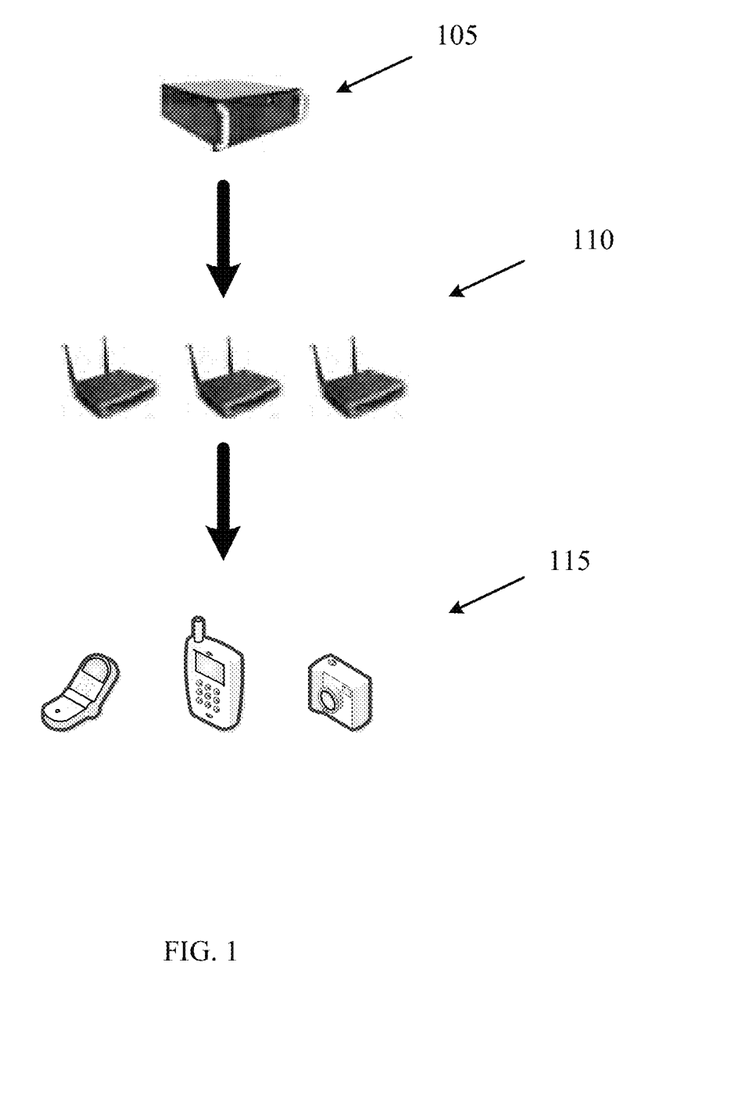
FIG. 1 is an illustration of an exemplary system for detecting, localizing, and/or quantifying interference impact, in accordance with an embodiment of the present invention.

FIG. 1 is an illustration of an exemplary system for detecting, localizing, and/or quantifying interference impact, in accordance with an embodiment of the present invention. In the present embodiment, a centralized controller 105 may collect statistics from observers, perform analysis of interferers, and/or perform localization analysis. In some embodiments, controller 105 may be incorporated into other devices. In the present embodiment, an access point 110 may perform observation of interferers. Further, in the present embodiment, wireless clients 115 may perform observation of interferers. In some embodiments, clients 115 may be any kind of transmitting device, including, without limitation, desktops, laptops, smartphones, etc.

Figure 2:
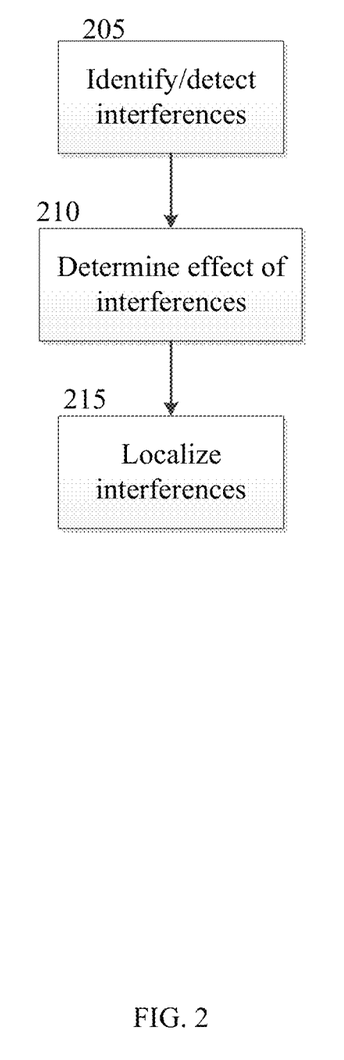
FIG. 2 is an illustration of an exemplary method for detecting, localizing, and/or quantifying interference impact, in accordance with an embodiment of the present invention.

FIG. 2 is an illustration of an exemplary method for detecting, localizing, and/or quantifying interference impact, in accordance with an embodiment of the present invention. In the present embodiment, a system may identify and/or detect one or more interferers in a step 205. Further, in the present non-limiting example, the system may identify a potential reduction in performance in a wireless communication system caused by one or more active interferers in a step 210.

Still further, in the present non-limiting example, the system may identify a location of one or more interferers in physical space in a step 215.

Some embodiments may be suitable to compute and/or measure interferences within any communication system. In a non-limiting example, a system may compute and/or measure interferences in a WiFi based system. In other non-limiting examples, a system may compute and/or measure interferences in: a television whitespace communication system wherein multiple devices may co-exist and/or interfere; a protocol having a defined frequency band, such as, without limitation, 60 GHz; and cellular frequencies wherein various sources may cause interference. In other non-limiting examples, the centralized controller operation may be performed any server/desktop machine which has network connectivity to the observers. In these examples, the observer may be any wireless radio which operates on a given frequency such as, but not limited to, whitespaces, 60 GHz etc. In some embodiments the observers may be operating in client/AP mode analogous to WiFi systems.

Many embodiments may be suitable for detecting, localizing, and/or quantifying interferences which may operate using an identical standard as a communication system of interest. In a non-limiting example, an embodiment may analyze an interference using a WiFi standard which may interfere with a communication system also using a WiFi standard. In the present non-limiting example, identification and detection analysis of the interference may be trivial, as decoding of an interferer (e.g., without limitation, a WiFi interferer) signal may allow for immediate determination of the WiFi standard and a uniquely defining MAC address associated with the interferer signal. Other embodiments may also be suitable for detecting, localizing, and/or quantifying interferences which may operate using a different standard than a communication system of interest.

In some embodiments, observation of interferences may be performed by any device. In a non-limiting example, a WiFi device such as, without limitation, a WiFi access point 110 or a WiFi client 115 may perform observation. In some embodiments, an observing device may be part of a communication system of interest. In a non-limiting example, an observing device may also be a transmitting device and/or a receiving device in a communication system. In other embodiments, an observing device may not be part of a communication system of interest.

In some embodiments, observing devices may perform active observation. In other embodiments, observing devices may perform passive observation.

Figure 3:
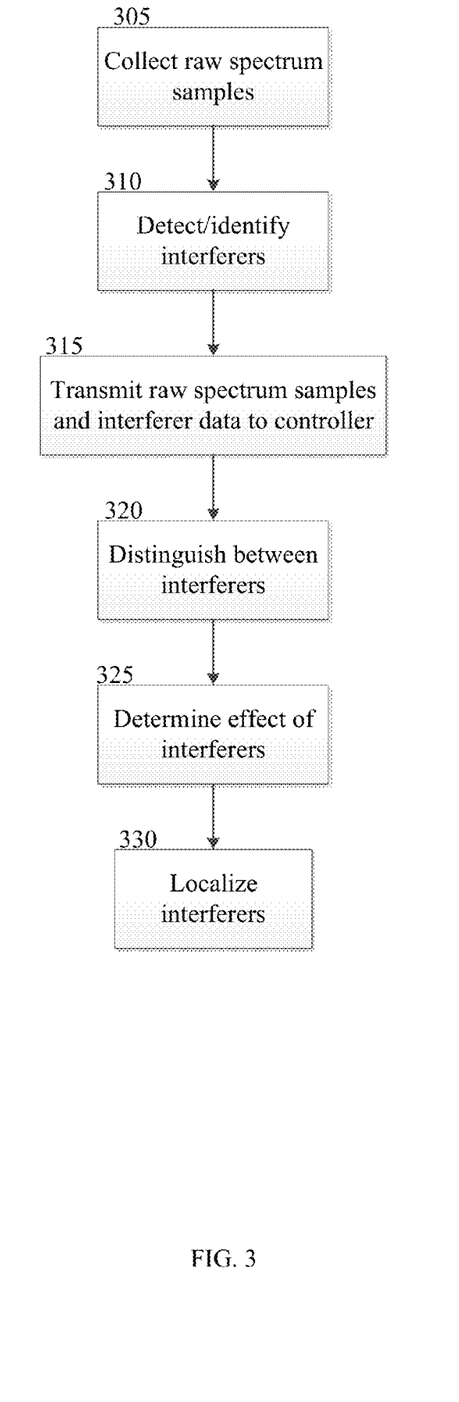
FIG. 3 is an illustration of an exemplary method for passively observing interferers, in accordance with an embodiment of the present invention.

FIG. 3 is an illustration of an exemplary method for passively observing interferers, in accordance with an embodiment of the present invention. In the present embodiment, a system may collect raw spectrum samples from one or more passive observers in a step 305. The collection of raw samples and interferer detection may occur at the individual observers which may be forwarded to the central controller. In some embodiments, passive observers may be WiFi-based. In the present embodiment, system may use raw spectrum samples to detect and/or identify types of neighboring interferers in a step 310. In some embodiments, system may detect and/or identify types of even non-WiFi transmitters. In many embodiments in which passive observers may be WiFi-based, system may identify interferers by using MAC addresses from observed WiFi packets. In the present embodiment, system may collect spectrum samples and/or interferer information at a logically central controller 105 in a step 315. Further, in the present embodiment, system may distinguish between different interferers in a step 320. In some embodiments, system may use timing and/or signal strength properties to distinguish different interferers. In some of these embodiments, system may distinguish even multiple interferers of same device type. In the present embodiment, central controller 105 may identify interference impact for individual interferers in a step 325. In some embodiments, controller 105 may identify interferer impact by correlating interferer transmissions with neighboring transmissions. In many embodiments, central controller 105 may perform identification in real-time. In some embodiments, system may transmit any interferer data not previously collected to central controller 105. In many embodiments, system may use transmission overlaps to determine interference impact. In the present embodiment, system may localize interferers in a step 330. In some embodiments, system may use interferer signal strength information gathered by observers to localize interferers. In some of these embodiments, localization algorithms may be model-based.

In many instances, a "pulse" may refer to a contiguous time-frequency block of radio frequency (RF) activity which may represent transmissions of potentially interfering devices. In a non-limiting example, a WiFi observing device may not decode a non-WiFi device, but may instead detect time-frequency blocks of high RF activity, each of which may be a pulse. In the present non-limiting example, a system may then match pulses to corresponding devices to determine a signature for the non-WiFi device.

Figure 4:
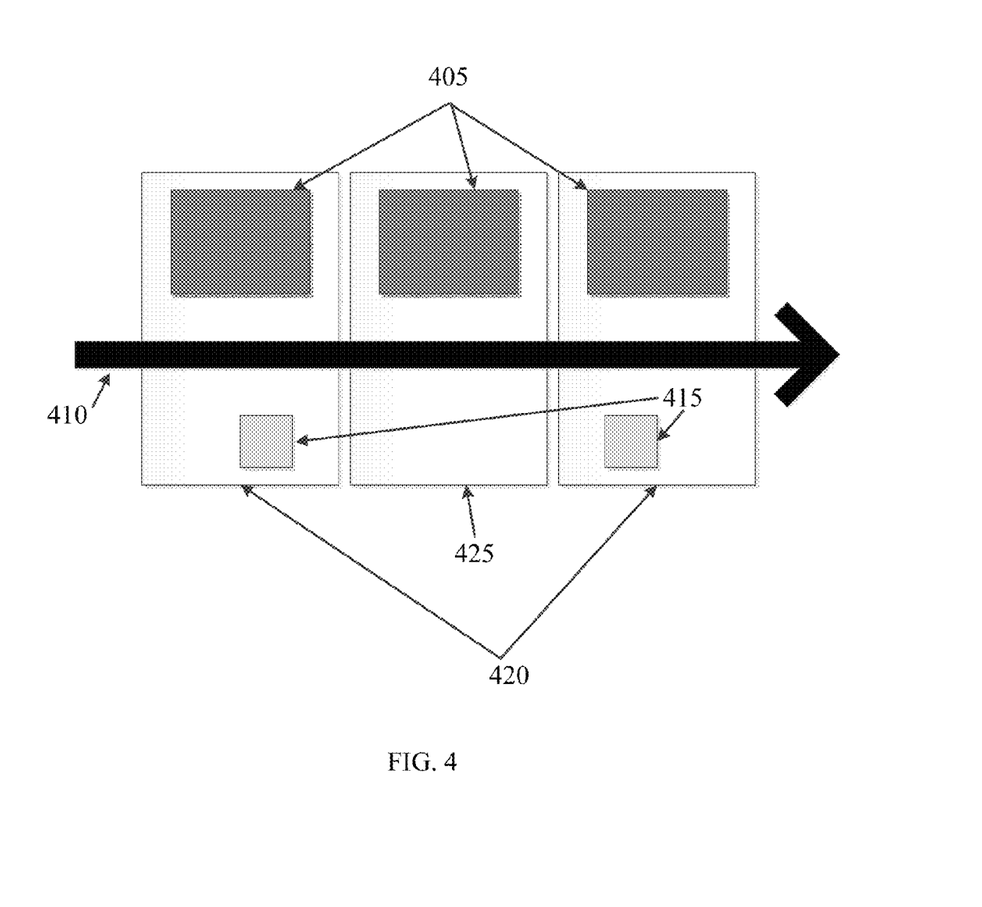
FIG. 4 is an illustration of an exemplary model for estimating device impact, in accordance with an embodiment of the present invention.

FIG. 4 is an illustration of an exemplary model for estimating device impact, in accordance with an embodiment of the present invention. In the present embodiment, WiFi frame transmissions 405 within a wireless communication system may pulsate over a passage of time 410. In a non-limiting example, an access point 110 and a client 115 may communicate bi-directionally using WiFi frame transmissions 405. In the present embodiment, a potentially interfering device may transmit "pulses" 415. In a non-limiting example, a cordless phone may transmit pulses 415 within a range of potential interference to WiFi frame transmissions 405.

In the present embodiment, WiFi frame transmissions 405 and pulses 415 may have overlap 420 at various points in time, which may cause a loss of WiFi frames 405. Further, in the present embodiment, at various other points in time, WiFi frame transmissions 405 and pulses 415 may not have overlap 425, which may result in WiFi frames 405 not being lost. In many embodiments, system may determine that devices having pulses 415 which may cause loss of WiFi frames 405 during periods of overlap 420 may be interfering devices. In some embodiments, system may compare any losses observed at periods of overlap 420 to any losses observed at periods of no overlap 425 to determine how much interference may be attributed to a device.

In a non-limiting example, a system may observe N occurrences of overlap 420 between WiFi frames 405 of a network A and pulses 415 of a device B. In the present non-limiting example, if only a subset M of the WiFi frames 405 are lost, the system may attribute some proportional interference impact (proportional to M/N) to device B. Further, in the present non-limiting example, periods of no overlap 425 may result in little or no loss of WiFi frames. In many embodiments, system may employ any method of analysis to estimate device impact using gathered information.

In many instances, "pulse consolidation" may refer to a grouping of pulses 415. In some embodiments, a system may have multiple observers which may observe pulses 415 at different strengths. In some of these embodiments, the multiple observers may also observe pulses 415 from multiple devices. In many embodiments, system may perform analysis to determine which pulses 415 may have been sent by a common device. In a non-limiting example, a first device, A, may emit pulses 415 A1, A2, and A3, each pulse 415 being emitted at a unique time. In the present non-limiting example, a second device, B, may emit pulses 415 B1 and B2. Further, in the present non-limiting example, a system may have three observers, X, Y, and Z. Still further, in the present non-limiting example, A1 may be received by two observers, X and Y (one may refer to received pulses as A1X and A1Y). In the present non-limiting example, A2 may be received by all observers, resulting in three observed pulses (A2X, A2Y, and A2Z). Further, in the present non-limiting example, A3 may be received by two observers, Y and Z, resulting in two observed pulses (A3Y and A3Z). Still further, in the present non-limiting example, B1 may be received by two observers, X and Y, resulting in two observed pulses (B1X and B1Y). Further, in the present non-limiting example, B2 may be received by all observers, resulting in three observed pulses (B2X, B2Y, and B2Z). In the present non-limiting example, the system may determine that there were five emitted pulses 415 corresponding to following groups: (A1X, A1Y); (A2X, A2Y, A2Z); (A3Y, A3Z); (B1X, B1Y); and (B2X, B2Y, B2Z).

In many embodiments, a clustering algorithm may determine which received pulses 415 may have been transmitted from a common device. In the above non-limiting example, a clustering algorithm may determine that there are two clusters of pulses 415: [(A1X, A1Y); (A2X, A2Y, A2Z); (A3Y, A3Z)] from device A may be a first cluster; [(B1X, B1Y); (B2X, B2Y, B2Z)] from device B may be a second cluster. In some embodiments, clustering may allow a system to make better statistical estimates.

In some embodiments, system may use any technique, including, without limitation, fingerprinting and RF modeling, to determine locations of potentially interfering devices. In some of these embodiments, a localizing technique may make use of information gathered by clustering algorithms and/or pulse consolidation to more accurately localize devices.

In some embodiments, observers may record time instants at certain events. In a non-limiting example, an observer may record a time instant whenever a device transmits packets and/or pulses. In some embodiments, system may perform statistical evaluations based on these observations to infer impact of interference. In some of these embodiments, system may report impact of interference in real-time. In a non-limiting example, if a WiFi receiver may be receiving a large amount of traffic (as a non-limiting example, user may be streaming a movie), a user may experience 70% interference from a nearby transmitter (e.g. another WiFi device) and 10% interference from a microwave oven (a non-WiFi device). In some embodiments, levels of interference may depend on activities of various devices, including, without limitation, observers, interferers, and other nearby devices, including, without limitation, devices involved in communication system of interest.

Some embodiments of the present invention may incorporate WiFi access points 110 as observers. In some of these embodiments, WiFi access points 110 may send observations to a centralized controller 105 that may analyze interference impact and/or localization information from various devices. Other embodiments may incorporate home access points 110 as observers. In some of these embodiments, home access points 110 may send observations to a central controller 105 in a cloud that may perform analysis of interference impact and/or localization of interferers. Some embodiments may incorporate WiFi client devices 115 as observers. Other embodiments may incorporate stand-alone devices dedicated to performing observation of channel properties. Still other embodiments may incorporate a combination of types of devices as observers.

Many embodiments may incorporate observers using any given technology (e.g. WiFi) which may perform observation of interferers using an identical technology to the observers or using a different technology.

In some embodiments, users may use system results to make changes to various parameters of interfering devices and/or devices affected by interfering devices to mitigate interference. In a non-limiting example in which a given system may employ WiFi technology, a user may change a channel of operation, transmit power, etc. to reduce interference impact.

Some embodiments may use fine grained (packet level in microseconds) timing information to accurately determine interference impact. Other embodiments may use aggregate statistics about packet losses which may occur near an interferer to determine interference impact. Still other embodiments may use timing properties of packet losses to determine interference.

In some embodiments, devices operating under a given technology (e.g. WiFi) may observe interfering devices operating under a different technology (e.g. non-WiFi) using pulse consolidation. Some embodiments may utilize a heuristic to consolidate pulses. A non-limiting exemplary heuristic may determine that two devices receiving a pulse may have received an identical pulse if each pulse is from a common device type (e.g. Bluetooth) and each pulse has an approximately identical timing, frequency, and bandwidth. The present non-limiting exemplary heuristic may allow for a pre-determined amount of difference in parameters. In a non-limiting example, a maximum difference between pulse times may be FFT sampling resolution of a WiFi card (116 μs for an AR9280 WiFi card) and maximum difference between pulse center frequencies may be resolution bandwidth of a WiFi card (e.g. 312.5 kHz or equal to 802.11 sub-carrier spacing). The 116 us in the example above is just one choice of FFT sampling resolution for the AR9280 card, and 312.5 kHz is just one choice of a resolution bandwidth used. In some of these embodiments other values may be used. The maximum difference in each case is the FFT sampling resolution and the resolution bandwidth respectively.

Because some suitable heuristics may require synchronization of pulse traces, some embodiments may leverage device hardware. In a non-limiting example, timestamps of pulses may be derived from an identical as used to timestamp captured WiFi frames. In some embodiments, system may synchronize clocks at access points 110 using captures "common" frames as reference points, and then may use synchronized access points 110 to find "common" pulses. In a non-limiting example, system may implement a graph-based, opportunistic synchronization approach in which a controller 105 may first synchronize pairs of access points 110 using common reference frames, and then may transitively synchronize all access points 110. In some of these embodiments, system may repeat synchronization process periodically (e.g. every 100 ms) to account for clock drift.

In some embodiments, controller 105 may apply appropriate synchronization offsets to each individual access point's 110 pulse trace and then may find common pulses among access points 110. In many embodiments, system may associate an RSS vector to represent received power.

Figure 5:
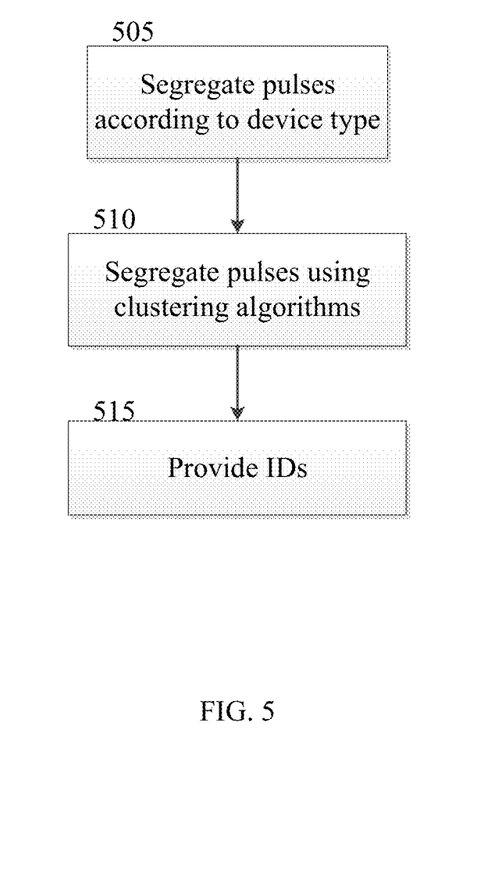
FIG. 5 is an illustration of an exemplary method for identifying unique interferers, in accordance with an embodiment of the present invention.

FIG. 5 is an illustration of an exemplary method for identifying unique interferers, in accordance with an embodiment of the present invention. In the present embodiment, system may segregate pulses according to device type in a step 505.

Further, in the present embodiment, system may further segregate pulses using clustering algorithms in a step 510. As a non-limiting example, the pulses in each cluster may belong to the same device type and exhibit similar signal strength and timing related patterns. Clustering may allow segregation of pulse transmissions belonging to different devices, even of the same type, without the need to decode the contents of transmission such as, but not limited to, parsing the semantics of the packet headers. In some embodiments, system may assign each pulse to a cluster (interferences employing a different technology than communication system of interest). In the present embodiment, system may provide IDs in a step 515. In some embodiments, system may provide IDs to combinations of device type and cluster center.

In some embodiments, system may perform RSS-based clustering, which may be applicable to any non-WiFi devices. In some of these embodiments, clustering may operate on N-dimensional RSS vectors (i.e., vector sizes may grow with number of access points 110). Further, in some of these embodiments, system may improve performance of clustering algorithms through use of various optimizations. In a non-limiting example, clustering may be performed every scan window (e.g. 5 seconds) to keep a number of pulses low. In another non-limiting example, dimensions corresponding to access points 110 which may not be receiving any pulse in a window may be discarded.

In other embodiments, system may perform clustering based on timing properties which may be specific to some non-WiFi device types. In a non-limiting example, a system involving a cordless phone may perform clustering based on pulse start time offsets to accommodate cordless phone cycles, which may cycle through frames of 10 ms. In another non-limiting example, a system may compute an offset for start of microwave oven pulses as t mod 16.66 to accommodate an ON-OFF pattern inherent in many microwave ovens.

In some embodiments, system may perform interference estimation by correlating a transmission within a communication system with an interferer's pulse transmissions and observing a reception status. In some of these embodiments, system may measure interferer's impact by computing probability of a frame loss when a frame overlaps with a simultaneous transmission from an interferer.

In many embodiments, system may perform localization through use of a computationally efficient, real-time localization scheme which may impose zero profiling overhead, and which may physically locate an interferer using a modeling-based approach. In other embodiments, system may perform localization through a process of selecting an access point 110 having a strongest received power as an interferer's location. In still other embodiments, system may perform localization through a process of selecting a centroid of multiple access points 110 having strongest received powers. In other embodiments, system may perform localization through an iteration process which may perform an exhaustive search over multiple parameters to find a grid with a maximum probability. In still other embodiments, system may perform localization through a fingerprinting approach in which system may collect fingerprints (RSS vectors) at sample locations.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 6:
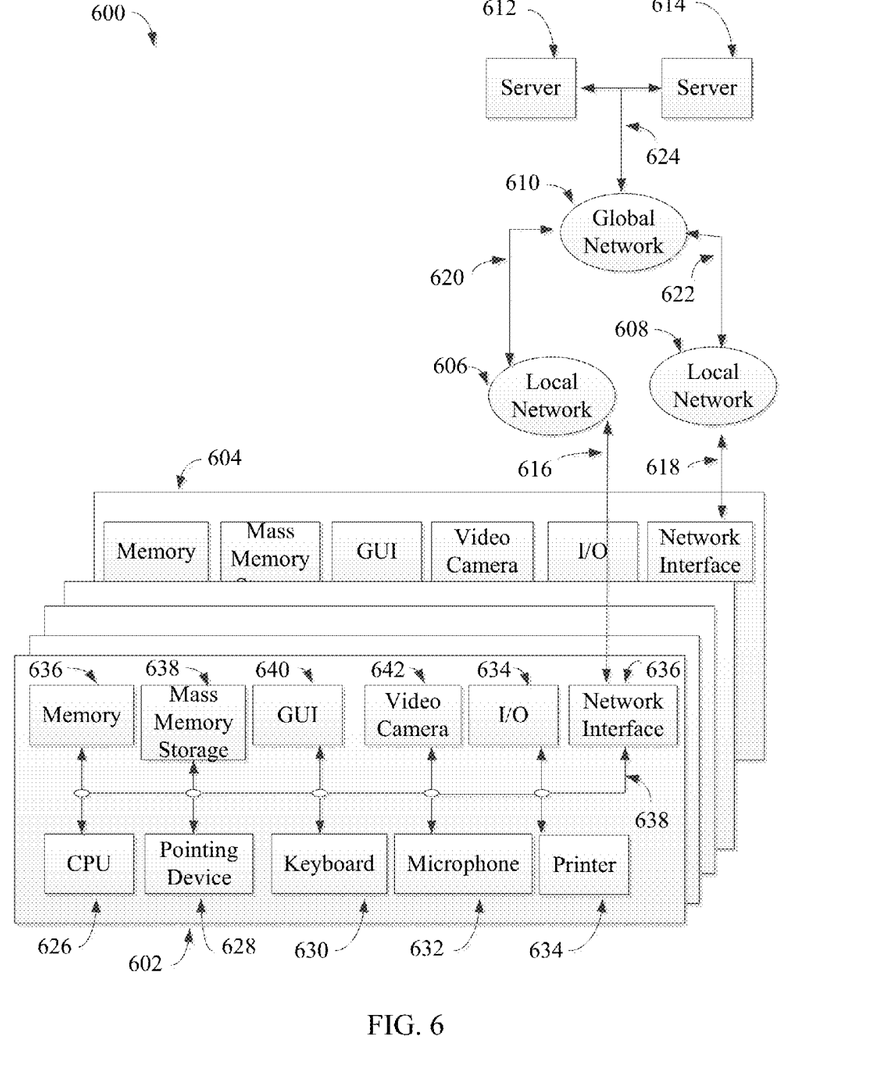
FIG. 6 is a block diagram depicting an exemplary client/server system which may be used by an exemplary web-enabled/networked embodiment of the present invention.

FIG. 6 is a block diagram depicting an exemplary client/server system which may be used by an exemplary web-enabled/networked embodiment of the present invention.

A communication system 600 includes a multiplicity of clients with a sampling of clients denoted as a client 602 and a client 604, a multiplicity of local networks with a sampling of networks denoted as a local network 606 and a local network 608, a global network 610 and a multiplicity of servers with a sampling of servers denoted as a server 612 and a server 614.

Client 602 may communicate bi-directionally with local network 606 via a communication channel 616. Client 604 may communicate bi-directionally with local network 608 via a communication channel 618. Local network 606 may communicate bi-directionally with global network 610 via a communication channel 620. Local network 608 may communicate bi-directionally with global network 610 via a communication channel 622. Global network 610 may communicate bi-directionally with server 612 and server 614 via a communication channel 624. Server 612 and server 614 may communicate bi-directionally with each other via communication channel 624. Furthermore, clients 602, 604, local networks 606, 608, global network 610 and servers 612, 614 may each communicate bi-directionally with each other.

In one embodiment, global network 610 may operate as the Internet. It will be understood by those skilled in the art that communication system 600 may take many different forms. Non-limiting examples of forms for communication system 600 include local area networks (LANs), wide area networks (WANs), wired telephone networks, wireless networks, or any other network supporting data communication between respective entities.

Clients 602 and 604 may take many different forms. Non-limiting examples of clients 602 and 604 include personal computers, personal digital assistants (PDAs), cellular phones and smartphones.

Client 602 includes a CPU 626, a pointing device 628, a keyboard 630, a microphone 632, a printer 634, a memory 636, a mass memory storage 638, a GUI 640, a video camera 642, an input/output interface 644 and a network interface 646.

CPU 626, pointing device 628, keyboard 630, microphone 632, printer 634, memory 636, mass memory storage 638, GUI 640, video camera 642, input/output interface 644 and network interface 646 may communicate in a unidirectional manner or a bi-directional manner with each other via a communication channel 648. Communication channel 648 may be configured as a single communication channel or a multiplicity of communication channels.

CPU 626 may be comprised of a single processor or multiple processors. CPU 626 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 636 is used typically to transfer data and instructions to CPU 626 in a bi-directional manner. Memory 636, as discussed previously, may include any suitable computer-readable media, intended for data storage, such as those described above excluding any wired or wireless transmissions unless specifically noted. Mass memory storage 638 may also be coupled bi-directionally to CPU 626 and provides additional data storage capacity and may include any of the computer-readable media described above. Mass memory storage 638 may be used to store programs, data and the like and is typically a secondary storage medium such as a hard disk. It will be appreciated that the information retained within mass memory storage 638, may, in appropriate cases, be incorporated in standard fashion as part of memory 636 as virtual memory.

CPU 626 may be coupled to GUI 640. GUI 640 enables a user to view the operation of computer operating system and software. CPU 626 may be coupled to pointing device 628. Non-limiting examples of pointing device 628 include computer mouse, trackball and touchpad. Pointing device 628 enables a user with the capability to maneuver a computer cursor about the viewing area of GUI 640 and select areas or features in the viewing area of GUI 640. CPU 626 may be coupled to keyboard 630. Keyboard 630 enables a user with the capability to input alphanumeric textual information to CPU 626. CPU 626 may be coupled to microphone 632. Microphone 632 enables audio produced by a user to be recorded, processed and communicated by CPU 626. CPU 626 may be connected to printer 634. Printer 634 enables a user with the capability to print information to a sheet of paper. CPU 626 may be connected to video camera 642. Video camera 642 enables video produced or captured by user to be recorded, processed and communicated by CPU 626.

CPU 626 may also be coupled to input/output interface 644 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 626 optionally may be coupled to network interface 646 which enables communication with an external device such as a database or a computer or telecommunications or internet network using an external connection shown generally as communication channel 616, which may be implemented as a hardwired or wireless communications link using suitable conventional technologies. With such a connection, CPU 626 might receive information from the network, or might output information to a network in the course of performing the method steps described in the teachings of the present invention.

Figure 7:
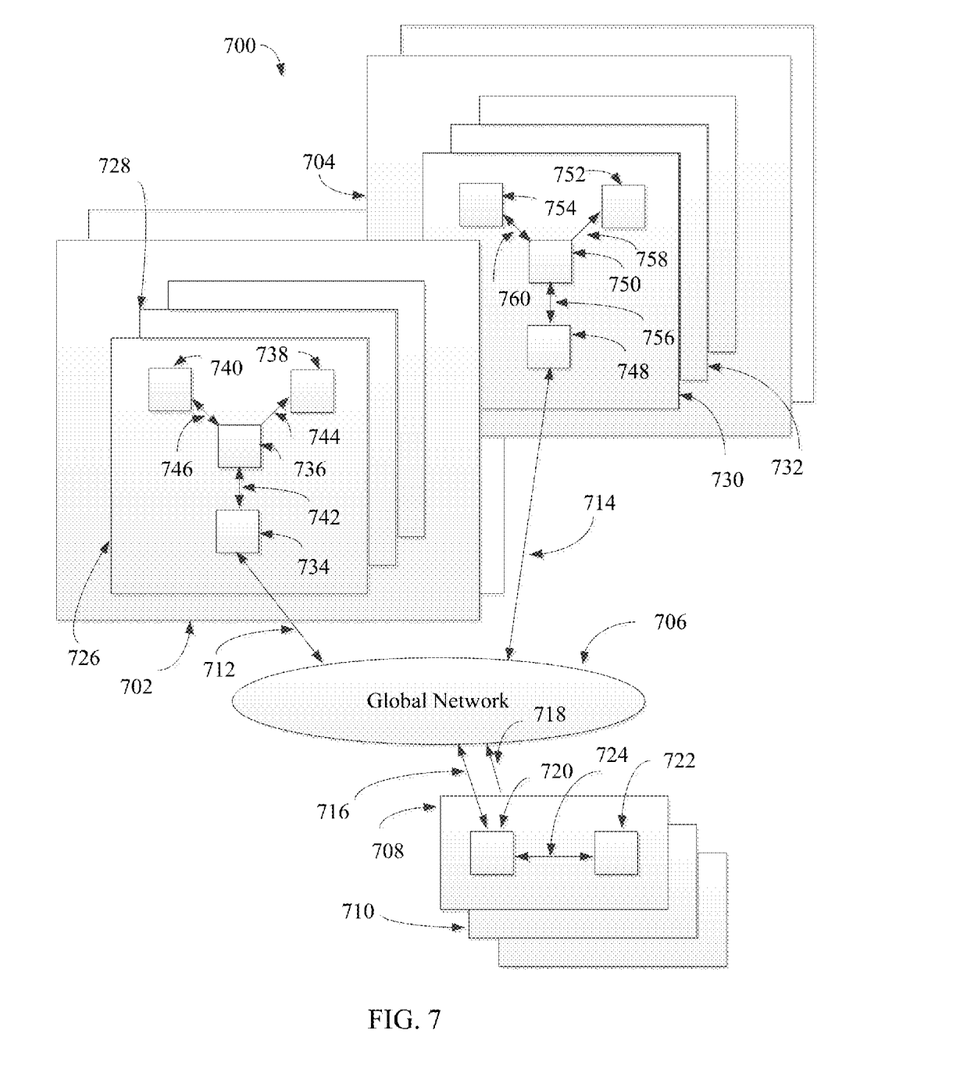
FIG. 7 illustrates a block diagram depicting a conventional client/server communication system.

FIG. 7 illustrates a block diagram depicting a conventional client/server communication system.

A communication system 700 includes a multiplicity of networked regions with a sampling of regions denoted as a network region 702 and a network region 704, a global network 706 and a multiplicity of servers with a sampling of servers denoted as a server device 708 and a server device 710.

Network region 702 and network region 704 may operate to represent a network contained within a geographical area or region. Non-limiting examples of representations for the geographical areas for the networked regions may include postal zip codes, telephone area codes, states, counties, cities and countries. Elements within network region 702 and 704 may operate to communicate with external elements within other networked regions or within elements contained within the same network region.

In some implementations, global network 706 may operate as the Internet. It will be understood by those skilled in the art that communication system 700 may take many different forms. Non-limiting examples of forms for communication system 700 include local area networks (LANs), wide area networks (WANs), wired telephone networks, cellular telephone networks or any other network supporting data communication between respective entities via hardwired or wireless communication networks. Global network 706 may operate to transfer information between the various networked elements.

Server device 708 and server device 710 may operate to execute software instructions, store information, support database operations and communicate with other networked elements. Non-limiting examples of software and scripting languages which may be executed on server device 708 and server device 710 include C, C++, C# and Java.

Network region 702 may operate to communicate bi-directionally with global network 706 via a communication channel 712. Network region 704 may operate to communicate bi-directionally with global network 706 via a communication channel 714. Server device 708 may operate to communicate bi-directionally with global network 706 via a communication channel 716. Server device 710 may operate to communicate bi-directionally with global network 706 via a communication channel 718. Network region 702 and 704, global network 706 and server devices 708 and 710 may operate to communicate with each other and with every other networked device located within communication system 700.

Server device 708 includes a networking device 720 and a server 722. Networking device 720 may operate to communicate bi-directionally with global network 706 via communication channel 716 and with server 722 via a communication channel 724. Server 722 may operate to execute software instructions and store information.

Network region 702 includes a multiplicity of clients with a sampling denoted as a client 726 and a client 728. Client 726 includes a networking device 734, a processor 736, a GUI 738 and an interface device 740. Non-limiting examples of devices for GUI 738 include monitors, televisions, cellular telephones, smartphones and PDAs (Personal Digital Assistants). Non-limiting examples of interface device 740 include pointing device, mouse, trackball, scanner and printer. Networking device 734 may communicate bi-directionally with global network 706 via communication channel 712 and with processor 736 via a communication channel 742. GUI 738 may receive information from processor 736 via a communication channel 744 for presentation to a user for viewing. Interface device 740 may operate to send control information to processor 736 and to receive information from processor 736 via a communication channel 746. Network region 704 includes a multiplicity of clients with a sampling denoted as a client 730 and a client 732. Client 730 includes a networking device 748, a processor 750, a GUI 752 and an interface device 754. Non-limiting examples of devices for GUI 738 include monitors, televisions, cellular telephones, smartphones and PDAs (Personal Digital Assistants). Non-limiting examples of interface device 740 include pointing devices, mousse, trackballs, scanners and printers. Networking device 748 may communicate bi-directionally with global network 706 via communication channel 714 and with processor 750 via a communication channel 756. GUI 752 may receive information from processor 750 via a communication channel 758 for presentation to a user for viewing. Interface device 754 may operate to send control information to processor 750 and to receive information from processor 750 via a communication channel 760.

For example, consider the case where a user interfacing with client 726 may want to execute a networked application.

A user may enter the IP (Internet Protocol) address for the networked application using interface device 740. The IP address information may be communicated to processor 736 via communication channel 746. Processor 736 may then communicate the IP address information to networking device 734 via communication channel 742. Networking device 734 may then communicate the IP address information to global network 706 via communication channel 712. Global network 706 may then communicate the IP address information to networking device 720 of server device 708 via communication channel 716. Networking device 720 may then communicate the IP address information to server 722 via communication channel 724. Server 722 may receive the IP address information and after processing the IP address information may communicate return information to networking device 720 via communication channel 724. Networking device 720 may communicate the return information to global network 706 via communication channel 716. Global network 706 may communicate the return information to networking device 734 via communication channel 712. Networking device 734 may communicate the return information to processor 736 via communication channel 742. Processor 746 may communicate the return information to GUI 738 via communication channel 744. User may then view the return information on GUI 738.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6).

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC §112 (6). Applicant(s) note that all the identified documents above which are incorporated by reference to satisfy 35 USC §112 (6) necessarily have a filing and/or publication date prior to that of the instant application, and thus are valid prior documents to incorporated by reference in the instant application.

Having fully described at least one embodiment of the present invention, other equivalent or alternative methods of implementing observation of wireless interference according to the present invention will be apparent to those skilled in the art. Various aspects of the invention have been described above by way of illustration, and the specific embodiments disclosed are not intended to limit the invention to the particular forms disclosed. The particular implementation of the observation of wireless interference may vary depending upon the particular context or application. By way of example, and not limitation, the observation of wireless interference described in the foregoing were principally directed to WiFi implementations; however, similar techniques may instead be applied to any wireless technology, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising:
   receiving spectrum data from one or more WiFi communication devices being configured to be operable as observers of transmissions within a frequency band associated with a WiFi communication system, the spectrum data at least comprising signal levels and timing information for WiFi communication signals and non-WiFi signals observed within the frequency band;
   distinguishing interferers using at least the signal levels and timing information for the non-WiFi signals;
   identifying unique interferers using at least observed pulses in the non-WiFi signals by segregating pulses according to device type using at least a clustering algorithm; and
   determining a real-time interference impact on the observed WiFi communication signals for each of the distinguished interferers.

2. The method of claim 1, further comprising localizing each of the interferers using at least signal levels of the interferers observed at a same time by a plurality of observers.

3. The method in claim 1, wherein said clustering operates on N-dimensional vectors.

4. The method in claim 1, wherein said clustering is performed during a scan window.

5. The method of claim 1, wherein said clustering is based at least in part on timing properties specific to non-WiFi device types.

6. The method of claim 1, wherein said identifying further comprises providing IDs to combinations of device type and cluster center.

7. The method of claim 1, further comprising consolidating the observed pulses.

8. The method of claim 1, further comprising:
   identifying a first set of pulses in the spectrum data associated with at least one radio frequency device;
   identifying a second set of transmission frames associated with at least one radio communication device;
   determining overlap between the first and second sets; and
   quantifying interference generated by the at least one radio frequency device based on the overlap.

9. The method of claim 8, further comprising quantifying the interference by comparing a first error metric for the at least one radio communication device during periods of overlap to a second error metric for the at least one radio communication device during periods of no overlap.

10. The method of claim 9, wherein the first and second error metrics comprise packet loss metrics and the method further comprises generating the first error metric based on a ratio between packets lost and a total number of packets transmitted by the radio communication device during the periods of overlap.

11. A system comprising:
   one or more WiFi communication devices to observe transmission within a frequency band associated with a WiFi communication system and to collect spectrum data at least comprising signal levels and timing information for WiFi communication signals and non-WiFi signals observed within the frequency band;
   a centralized controller to receive said spectrum data from said WiFi communication devices, to distinguish interferers using at least said signal levels and timing information for said non-WiFi signals, to localize each of said interferers using at least signal levels of said interferers observed at a same time by a plurality of observers, to identify unique interferers using at least observed pulses in said non-WiFi signals, to segregate said pulse according to device type using at least a clustering algorithm operating on N-dimensional vectors during scan window, said clustering algorithm being based at least in part based on timing properties specific to non-WiFi device types, to provide IDs to combinations of device type and cluster center, and to determine a real-time interference impact on said observed WiFi communication signals for each of said distinguished interferers.

12. The system of claim 11, wherein the centralized controller is to identify a first set of pulses in the spectrum data associated with the at least one radio frequency device, identify a second set of transmission frames associated with at least one radio communication device, determine overlap between the first and second sets, and quantify interference generated by the at least one radio frequency device based on the overlap.

13. The system of claim 12, wherein the centralized controller is to quantify the interference by comparing a first error metric for the at least one radio communication device during periods of overlap to a second error metric for the at least one radio communication device during periods of no overlap.

14. The system of claim 13, wherein first and second error metrics comprise packet loss metrics, and the centralized controller is to generate the first error metric based on a ratio between packets lost and a total number of packets transmitted by the radio communication device during the periods of overlap.

15. A non-transitory computer-readable storage medium with an executable program stored thereon, wherein the program when executed by one or more processor, performs a method, comprising:
receiving spectrum data from one or more WiFi communication operable as observers of transmissions within a frequency band associated with a WiFi communication system, the spectrum data at least comprising signal levels and timing information for WiFi communication signals and non-WiFi signals observed within the frequency band;
distinguishing interferers using at least the signal levels and timing information for the non-WiFi signals;
identifying unique interferes using at least observed pulses in the non-WiFi signals by segregating pulses according to device type using at least a clustering algorithm; and
determining a real-time interference impact on the observed WiFi communication signals for each of the distinguished interferers.

16. The non-transitory computer-readable storage medium of claim 15, the method further comprising localizing each of the interferes using at least signal levels of the interferers observed at a same time by a plurality of observers.

17. The non-transitory computer-readable storage medium of claim 15, wherein said clustering operates on N-dimensional vectors.

18. The non-transitory computer-readable storage medium of claim 15, wherein said clustering is based at least in part on timing properties specific to non-WiFi device types.

19. The non-transitory computer-readable storage medium of claim 15, wherein said identifying further comprises providing IDs to combinations of device type and cluster center.

20. The non-transitory computer-readable storage medium of claim 15, the method further comprising:
identifying a first set of pulses in the spectrum data associated with at least one radio frequency device;
identifying a second set of transmission frames associated with at least one radio communication device;
determining overlap between the first and second sets; and
quantifying interference generated by the at least one radio frequency device based on the overlap.

* * * * *